(12) United States Patent
Steger et al.

(10) Patent No.: US 9,896,012 B2
(45) Date of Patent: Feb. 20, 2018

(54) SIDE EMPTYING LIQUID CONTAINING DRILL CUTTINGS TRANSPORT VESSEL

(71) Applicant: RECOVER ENERGY SERVICES INC., Calgary (CA)

(72) Inventors: Gregory Steger, Calgary (CA); Stan Ross, Cochrane (CA); Wendell Palmer, Cochrane (CA)

(73) Assignee: RECOVER ENERGY SERVICES INC., Calgary, Alberta (CA)

( * ) Notice: Subject to any disclaimer, the term of this patent is extended or adjusted under 35 U.S.C. 154(b) by 0 days.

(21) Appl. No.: 15/252,967

(22) Filed: Aug. 31, 2016

(65) Prior Publication Data

US 2017/0057393 A1    Mar. 2, 2017

Related U.S. Application Data

(60) Provisional application No. 62/212,889, filed on Sep. 1, 2015.

(51) Int. Cl.
   *B60P 1/16* (2006.01)

(52) U.S. Cl.
   CPC .................... *B60P 1/165* (2013.01)

(58) Field of Classification Search
   CPC .......... B60P 1/165; B60P 1/283; B60P 1/286; B60P 1/34; B60P 3/122; B60P 1/24; B60P 1/28; B60P 1/32; F17B 1/14

USPC ...... 298/18, 17.7, 8 R, 22 P, 1 A, 11, 7, 8 T, 298/22 C, 38; 220/495.01; 414/470, 11, 414/462, 421, 390, 570, 812, 809
   See application file for complete search history.

(56) References Cited

U.S. PATENT DOCUMENTS

| | | | | |
|---|---|---|---|---|
| 2,552,119 | A * | 5/1951 | Scharenberg | B64D 37/06 220/4.15 |
| 4,611,724 | A * | 9/1986 | Watkins | B60P 3/221 220/553 |
| 4,775,070 | A * | 10/1988 | Williams | B65D 90/52 105/358 |
| 5,779,092 | A * | 7/1998 | Hehn | B60P 3/224 137/574 |
| 5,887,914 | A * | 3/1999 | Hagenbuch | B60P 1/16 296/183.2 |
| 6,106,072 | A * | 8/2000 | Lutter, Jr. | B60P 1/165 298/17.5 |
| 2014/0353308 | A1 | 12/2014 | MacLean et al. | |

* cited by examiner

*Primary Examiner* — D Glenn Dayoan
*Assistant Examiner* — Sunsurraye Westbrook
(74) *Attorney, Agent, or Firm* — Greenblum & Bernstein, P.L.C.

(57) ABSTRACT

A transport vessel and method specifically adapted for safely transporting liquid containing unstabilized drill cuttings. Typically drilling waste is stabilized using binding agents like fly-ash, liquids absorbing pellets or sawdust. In many jurisdictions binding agents are required to stabilize the drilling waste prior to transport. A sealed transport vessel is described herein which is specifically designed, sized and positioned over a set of axles so as to provide for safe, non-spilling transport, and particular ease of emptying for unstabilized drill cuttings.

15 Claims, 5 Drawing Sheets

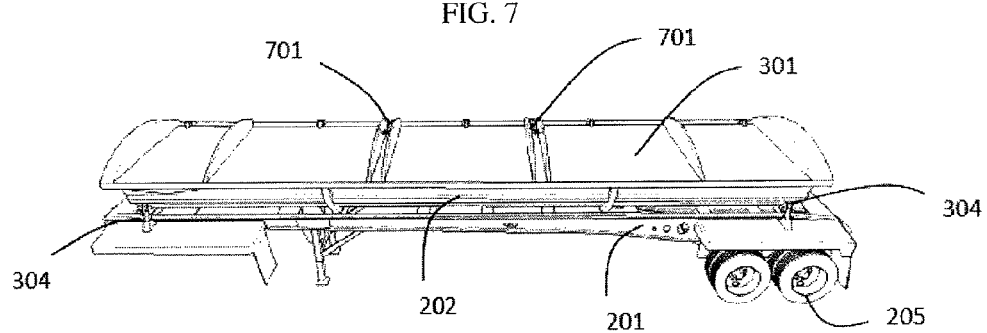
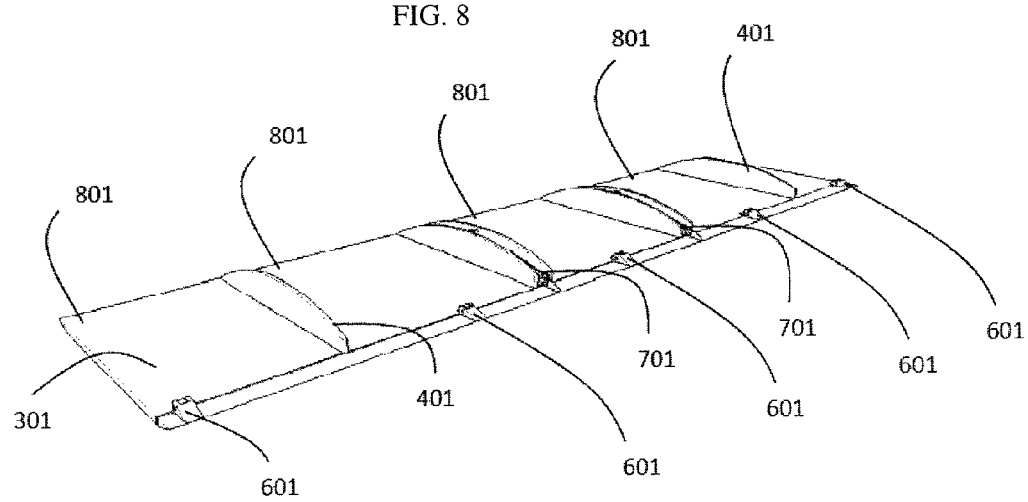

SIDE EMPTYING LIQUID CONTAINING DRILL CUTTINGS TRANSPORT VESSEL

CROSS-REFERENCE TO RELATED APPLICATIONS

The present application claims the benefit under 35 U.S.C. § 119(e) of U.S. Provisional Application No. 62/212,889 filed Sep. 1, 2015, the disclosure of which is expressly incorporated by reference herein in its entirety.

TECHNICAL FIELD

The field of art to which this invention generally pertains is the transport and processing of drill cuttings.

BACKGROUND

During the drilling of a well, gas or oil for example, drilling mud is typically pumped down the drill string through a drill bit. The drilling mud simultaneously cools the bit and carries drill cuttings up the well bore. Drilling mud is typically comprised of a fluid (or fluids), and mixture of additives which can be either fluids or solids, forming a useable drilling fluid. Oil based or brine based drilling fluids are often used to drill oil and gas wells because they have special characteristics that make them a better cooling/carrying fluid than other drilling muds. Additionally, such drilling muds may offer better wellbore stability and/or lubricity for the drill string in modern, horizontal wellbores.

Typically, the drill cuttings which are carried up the wellbore are subjected to solids separating devices when the cuttings exit the wellbore, such as that of shale shakers or decanter centrifuges. These mechanical separators allow a substantial portion of the drilling mud to be returned to the storage tanks for reuse, while the drill cuttings portion is sent to separate storage tanks. The drill cuttings still contain residual amounts of the drilling mud that couldn't be separated through mechanical means, and this residual drilling mud is considered to be contamination.

The drill cuttings are commonly known as drilling waste, because they serve no purpose after they have been removed from the wellbore. Thus, the contaminated drill cuttings are typically stabilized with a bulking agent, such as fly-ash, sawdust, or liquid absorbing pellets, to prevent residual free liquids from leaching from the solids during transport. The cuttings are then typically transported to a secure landfill where they are stored for an indeterminate period of time, typically generations.

With the evolution of new technologies and the increasing cost of drilling fluids, the ability to, and benefits of, reclaiming the lost drilling fluids is increasing. However, technologies such as thermal extraction, solvent washes, or alternate mechanical separators work less effectively, if at all, with bulking agents added prior to shipping.

Typically, stabilized drill cuttings are loaded into open top, sealed end dumps and then moved to a secure waste landfill. A sealed end dump is a large open trailer which allows the material to be moved by loader or excavator into the trailer, while the sealed nature of the end dumping gate ensures any transient liquids that are able to leach from the stabilized drill cuttings, remains in the trailer during transport. A tarp or net is moved over the load to ensure that a minimum amount of moving air is in contact with the stabilized drilling waste, preventing it from becoming airborne and leaving the trailer.

This has proven to be a convenient and economical way to transport stabilized drill cuttings. However, the use of this type of transport vessel, which has become an industry standard for transporting drilling waste, may not be a practical, or jurisdiction dependent, legal way to transport unstabilized drilling waste, especially because of potential safety issues. For example, if bad road conditions, driver error, or other adverse circumstances, contribute to an accident, or cause trailer over-turning, the load could easily spill out of the transport vessel onto the ground or otherwise end up in a water-way. The flammable or toxic nature of the oil base or brine base drilling mud contaminating the drill cuttings could cause significant environmental damage or even loss of life.

Thus, the need to transport unstabilized drill cuttings in a safe, efficient manor has arisen.

BRIEF SUMMARY

A transport vessel specifically adapted for transporting liquid containing unstabilized drill cuttings is described, including a moon shaped container body capable of holding liquid containing unstabilized drill cuttings, the body being longer than it is wide and having two side sections uniformly connected through a smoothly transitioning bottom section, a front section, and an end section, including a baffle section located in substantially the center of its longitudinal length, thereby creating two cargo sections defined by the baffle section and the front and end sections respectively, the substantially moon shaped container body being able to be tilted along its length around a horizontal access so as to empty the contents of the body, the body section being covered with a liquid sealing lid section, the liquid sealing lid section being removably attached to the rectangular body so as to permit ease of filling and emptying of the vessel with liquid containing unstabilized drill cuttings, at least two axles attached to the bottom section and supporting the substantially moon shaped body, where the transport vessel provides stable transport of liquid containing unstabilized drill cuttings absent leakage, loss or spillage of liquid from the vessel in transport or when the vessel is in a position other than horizontal and the lid section is closed.

Additional embodiments include: the vessel described above having an internal volume of up to about 9 cubic meters for each cargo section; the vessel described above configured to contain about 2 to about 3 cubic meters per axle; the vessel described above including 2 axles; the vessel described above including 3 axles; the vessel described above where the container body is removably attached to the axles through rails which allow the container body to empty its load over the side of the transport vessel; the vessel described above capable of holding up to the legal limit of liquid containing unstabilized drill cuttings; the vessel described above where the liquid containing unstabilized drill cuttings are oil based mud drill cuttings or water containing salt based drill cuttings; the vessel described above where the baffle and the axles are positioned so as to provide a substantially equal weight distribution of liquid containing unstabilized drill cuttings on each set of axles during transport; multiple vessels as described above, connected in series.

A method of transporting liquid containing unstabilized drill cuttings is also described including filling the vessel described above with liquid containing unstabilized drill cuttings, transporting the filled vessel to a pre-determined dumping location, and unloading the liquid containing unstabilized drill cuttings from the vessel, without any leakage of liquid from the drill cuttings during transport.

Additional embodiments include: the method described above where the cuttings contain about 20% to about 50% liquids by volume; the method described above where the vessel is filled with cuttings up to the legal weight limit per axle and legal weight limit for the total number of axles for each vessel; the method described above where the unstabilized drill cuttings are oil based mud drill cuttings or water containing salt based drill cuttings.

A transport vessel as described above including multiple baffle sections located in the container body, thereby creating corresponding multiple cargo sections is also described.

These, and additional embodiments, will be apparent from the following descriptions.

BRIEF DESCRIPTION OF THE DRAWINGS

FIG. 7 shows a general view of the sealed side dump trailer from the side FIG. 8 shows a singular view of the lid/roof section

DETAILED DESCRIPTION

Figure 1:
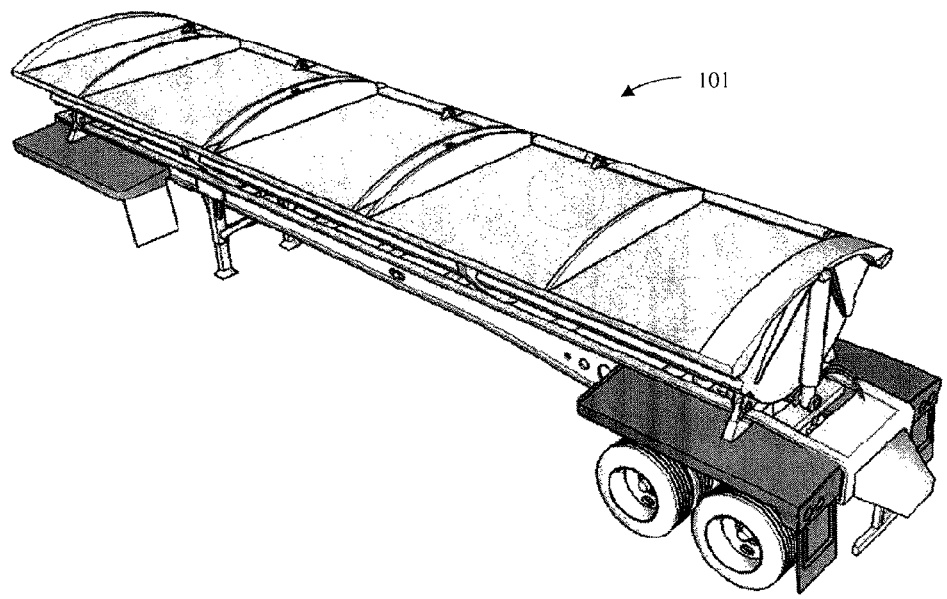
FIG. 1 shows an illustration of a sealed side dump transport vessel
Figure 2:
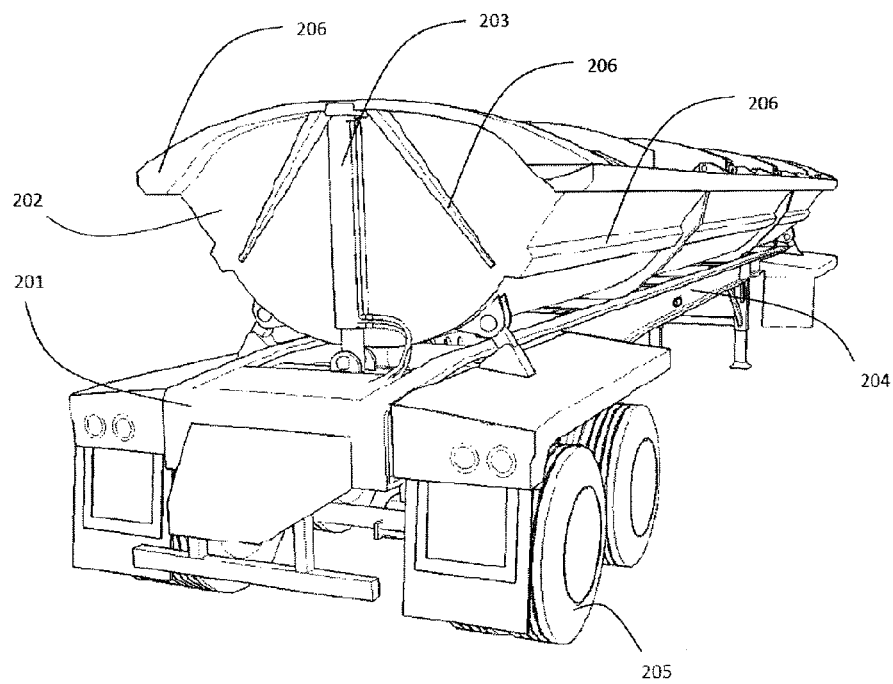
FIG. 2 shows a rear/side view of the sealed side dump transport vessel

The particulars shown herein are by way of example and for purposes of illustrative discussion of the various embodiments of the present invention only and are presented in the cause of providing what is believed to be the most useful and readily understood description of the principles and conceptual aspects of the invention. In this regard, no attempt is made to show details of the invention in more detail than is necessary for a fundamental understanding of the invention, the description making apparent to those skilled in the art how the several forms of the invention may be embodied in practice.

The present invention will now be described by reference to more detailed embodiments. This invention may, however, be embodied in different forms and should not be construed as limited to the embodiments set forth herein. Rather, these embodiments are provided so that this disclosure will be thorough and complete, and will fully convey the scope of the invention to those skilled in the art.

Unless otherwise defined, all technical and scientific terms used herein have the same meaning as commonly understood by one of ordinary skill in the art to which this invention belongs. The terminology used in the description of the invention herein is for describing particular embodiments only and is not intended to be limiting of the invention. As used in the description of the invention and the appended claims, the singular forms "a," "an," and "the" are intended to include the plural forms as well, unless the context clearly indicates otherwise. All publications, patent applications, patents, and other references mentioned herein are expressly incorporated by reference in their entirety.

Unless otherwise indicated, all numbers expressing quantities of ingredients, reaction conditions, and so forth used in the specification and claims are to be understood as being modified in all instances by the term "about." Accordingly, unless indicated to the contrary, the numerical parameters set forth in the following specification and attached claims are approximations that may vary depending upon the desired properties sought to be obtained by the present invention. At the very least, and not as an attempt to limit the application of the doctrine of equivalents to the scope of the claims, each numerical parameter should be construed in light of the number of significant digits and ordinary rounding approaches.

Notwithstanding that the numerical ranges and parameters setting forth the broad scope of the invention are approximations, the numerical values set forth in the specific examples are reported as precisely as possible. Any numerical value, however, inherently contains certain errors necessarily resulting from the standard deviation found in their respective testing measurements. Every numerical range given throughout this specification will include every narrower numerical range that falls within such broader numerical range, as if such narrower numerical ranges were all expressly written herein.

Additional advantages of the invention will be set forth in part in the description which follows, and in part will be obvious from the description, or may be learned by practice of the invention. It is to be understood that both the foregoing general description and the following detailed description are exemplary and explanatory only and are not restrictive of the invention, as claimed.

As mentioned above, without stabilization material, the otherwise wet drill cuttings can readily leach free liquids, which is obviously an unacceptable waste behavior both during transport and at any landfill, or during the unloading process at a waste treatment facility. The cuttings also typically move and behave like a liquid, for example within the transport vessel, due to the high amounts of oil, water or other liquid on the drill cuttings. On a volumetric basis, the cuttings can contain, between about 20% and about 50% liquid. The unstabilized drill cuttings are typically contaminated with oil based drilling mud, in amounts significant enough that they would have negative and adverse impact on the environment if not properly treated, or disposed of.

The use of brine based drill cuttings have become more common because they can offer a faster rate-of-penetration when drilling a well. Brine (or salt) based drilling fluids are almost as expensive as oil based mud systems. Some typical oil based muds use distillate or mineral oil as the base hydrocarbon to build the mud. Brine systems and formates are also used. While one would think that brine would be considered much friendlier to the environment than oil, it's actually the opposite. The effects of a spill on the environment can be more serious and last much longer, especially on vegetation. Brines (e.g., mixtures of chlorides and water) allow good hole stability and high penetration rates. They are very hard on seals, pumps, metal tanks, hoses, etc., however. They can also be a cause of a drilled well to stop producing. That being said, they are still a popular form of drilling.

Because of these and other issues, various transport methods for transporting unstabilized drill cuttings have been attempted. One example is a vacuum truck which can self-load unstabilized drill cuttings using negative air pressure until the transport vessel is adequately filled and a maximum legal amount of weight is exhibited per axle. The load is self-contained and can be considered safe for transport. If something should happen to the transport vessel, the vessel is designed so that a minimum to no unstabilized drilling waste comes in contact with the environment. On the downside, the loading process for this type of vessel is very slow, and of course the use of such things as conventional excavators or loaders would be precluded.

Another example is transport vessels specifically designed to transport and unload viscous materials. These vessels include vibration devices and optionally heat, such as hot air, to reduce the surface tension the waste may have on the transport vessel. Vibration is used to remove the viscous or sticky materials. While vibration may help in removing drilling waste from a vessel, hot air would have little to no effect on removing unstabilized drilling waste. The hot air would simply warm the top surface of the drilling waste, and not the bottom section, which is where the drilling waste would adhere to the surface of the transport vessel.

Another example is a rectangular cube having a sealed end gate and sealed lid/roof section, all of which are mounted on a loadable skid. The cube allows the lid to be lifted so that jobsite equipment such as a loader or back hoe can load the vessel. The lid and end gate are intended to minimize the unstabilized drilling waste coming into contact with the environment. However, this type of transport vessel is very heavy due to its larger size, which is necessary for the movement of products having low bulk densities, which is advantageous for higher asset utilization. However, the larger size adversely impacts the amount of low bulk density cargo weight that can be moved on each trip. Also, only specialized trucks equipped with a lifting device can move the transport vessel.

Another example is a transport vessel which consists of a sealed end dump trailer with a sealed lid/roof section. The vessel can include the use of an interconnected baffle system which is connected to the end gate. When the end gate is locked, the baffles are also locked which would prohibit movement of unstabilized drilling waste, for example, which would have a tendency to move from one set of axles to another when the truck is traveling up or down a hill. However, a transport vessel equipped with an interconnected baffle system will suffer similar drawbacks as what is seen in conventional end dump transport vessels; in order to achieve higher asset utilization, the vessel will need to be able to haul a variety of mediums that could have very low bulk densities, thus needing the transport vessel to be a similar size as traditional end dump transport vessels. Further, the interconnected baffle system is only partially successful in keeping the medium from moving from one set of axles to another. In order to ensure the baffle system will swing open when the end gate is unlocked, there must be at least a partial clearance between the wall and each baffle, which is counterproductive to the intent of the baffle system because the fluidic nature of the drill cuttings can then flow past the baffle system thereby changing the weight distributed on each axle. Not only is weight redistribution a problem for the driver if he is maintaining a legal load, but if the driver is transporting the load on an icy, muddy, wet or an otherwise challenging road system, weight redistribution can have a severe impact on the drivers ability to maintain control of the truck and transport vessel. The interconnected baffle system can also be a hindrance to the efficiency of the driver because he or she would typically deliberately under-load the transport vessel in anticipation of load movement, thereby reducing the 'pay-load' of each trip, in a best effort to reduce the likelihood of being cited for a weight violation. The interconnected baffle system is a further hindrance when the driver is transporting materials that have a structure that promotes compaction when agitated. Compaction of structured material occurs when the transport vessel is in motion and can cause the material to pack around the interconnected baffle system thereby holding the baffle system tightly in place, even when the transport vessel is moved to an unloading position and the sealed end gate is unlocked. The interconnected design of the baffle system can actually be counterproductive to the unloading process because the sealed end gate is interconnected to a baffle secured in the locked position by the compacted medium. See, for example, U.S. Published Patent Application No. 2014/0353308, the disclosure of which is herein incorporated by reference.

As described herein, these problems and others in this area are addressed through the use of one or more transport vessels (101) which are built like that of a substantially moon shaped (classic semi-circular cross section, or substantially U-shaped) container (202) reinforced where necessary to provide container rigidity (206), including a sealed lid/roof section (301), supported on rails of a multi-axle trailer (204). While other shapes can be used, for example V shaped, the moon shaped option could provide one of the most, if not the most, manufacturing friendly options available, i.e., ease of manufacture, and also provide for the easiest use of the scraper (further described below). Given the specialized nature of transport vessels in both design, and the fact that they will be dedicated to hauling oily, salty or otherwise hazardous waste streams, there will be no cross contamination of otherwise clean loads that could be hauled in traditional side or end dump transport vessels, for example, peat moss, bark mulch, sawdust, sand, gravel, loam, top soil, or otherwise non-hazardous materials that may be transported from time to time. The length and width of the moon shaped transport vessel (101) becomes less critical because the unstabilized drilling waste is unable to redistribute itself from one axle (205) to another with the solid baffle system (305), which helps control the weight exhibited by the transport vessel and cargo within, e.g., so as not to exceed the legal axle loading permitted on roadways or other transportation corridors and, minimizes the adverse control of the transport vessel caused by the load shifting on challenging roadways or transportation corridors (see Tables 1-4, for example). For example, a single transport vessel with two axles could measure about 40 feet long, about 3 feet high, and about 7.5 feet wide. Volumetrically, this vessel could hold up to approximately 9 cubic meters of material within each cargo area of the transport vessel. Generally, this volume is larger than what would be needed for a two axle trailer hauling unstabilized drill cuttings because the bulk density of the unstabilized drill cuttings is typically 1300 kilograms/cubic meter to about 2400 kilograms/cubic meter, more typically about 1600 kilograms/cubic meter to about 2100 kilograms/cubic meter, and most typically 1850 kilograms/cubic meter. A driver would be responsible for loading each open cargo area of the vessel (303) until such time that the axles are carrying a legal, recommended, or desired amount of weight. Calculating the weight on each set of axles (205) is the responsibility of the driver and is done by either visual estimation of the volume of the unstabilized drill cuttings, multiplied by the bulk density or, onboard electronic weight indicators or more typically, observing the pressure gauge connected to the airbags (403) of each set of axles which allow the driver to load the transport vessels up to a certain pressure, which allow the driver to accurately estimate the weight of each set of axles.

Once the side dump transport vessel is loaded to the satisfaction of the driver, the driver will activate the sealed lid/roof section hydraulic cylinder valve and cause the hydraulic cylinders (701) to activate, thereby moving the lid/roof section (301) to come in contact with the transport vessel wall and sealing section (302). The transport vessel lifting ram (203) is also intended to be set back on both the front and back of the transport vessel, so that it does not interfere with the smooth sealing section that runs along the edge (302), wherever the lid/roof section (301) is in direct contact with the transport vessel (101). The location and the number of hydraulic cylinder(s) (203) that are required to move the lid/roof section (301) from an open to closed, or closed to open position is dependent on the weight of the sealed lid/roof section, and capacity of the hydraulic cylinders installed and therefore of less importance to the details within other than to say one or more hydraulic cylinders would be required to operate the lid roof section safely. The location of the valve that closes the lid/roof section is typically located at a location which is considered to be convenient and safe for the driver to operate. While the hydraulic cylinders will cause the lid/roof section to remain closed, the driver would additionally lock the lid/roof section in place using a locking mechanism (801), for example, wing nuts and bolts to ensure it is cannot become removably detached, even if the transport trailer (101) were to overturn while moving down a roadway or transport corridor. Wing nuts and bolts, or an air or hydraulic locking mechanism would be selected from those otherwise readily available to those skilled in manufacturing transport vessels. Given the locking mechanism is conventional and readily available, it has not been included in the figures. However, they are typically located as shown (801) in FIG. 8.

As described above, and shown in the figures, the container is sized so as to properly distribute the weight of the cuttings over each axle, eliminating the need for interconnected baffles, or other adjustments, to provide for stable transport of the cuttings. This, coupled with the sealed lid/roof section (301), provides for spill free, stable transport, even if the transport vessel is being moved over a challenging roadway or transportation corridor. More importantly, in spite of the relatively long length of the vessel, because of the baffle (305) included therein, more weight can be packed on each trip and the cuttings would be restricted from moving off of one set of axles, putting additional weight on another set of axles (205). As described herein, based on this control of the size and baffle configuration of the vessel as described herein, the cuttings are restricted from moving around in the vessel and causing the weight to shift.

The bottom, walls and sealing lid can all be made of typical transport materials, e.g., metal, steel, etc., used in transport vehicles. The sealing materials used around the edges of the sealing lid are typically sealing plastic or rubber, for example. Any material which prevents or inhibits the leakage of liquid materials can be used. It can be molded, mechanically attached, or glued to the lid and end gate in a thickness and width so as to accomplish the required liquid sealing. While the width or thickness of the rubber material, for example, could match the thickness of the metal lid or end gate, it would not necessarily be so. Again, the point is to attain liquid leakage prevention, so any width and thickness which accomplishes this objective can be used.

The thickness of the walls and sealing lid can vary, for example, from as little as ¼ inch to ½ inch or less, to as thick as ¾ inch or more. The moon shaped bottom or floor of the vessel would typically be made of ¼ inch plate steel to prevent the load from damaging the transport vessel (i.e., unlikely to cause wash boarding between the cross members).

As described in commonly assigned, co-pending U.S. provisional patent application Ser. No. 62/120,546, the disclosure of which is hereby incorporated herein, the bottom sections of the transport vessels can additionally contain one or more heating elements capable of raising the temperature of the drill cuttings at or near the bottom section of the container to a free flowing state for unloading or emptying, for example, when transporting in extremely cold weather.

Figure 5:
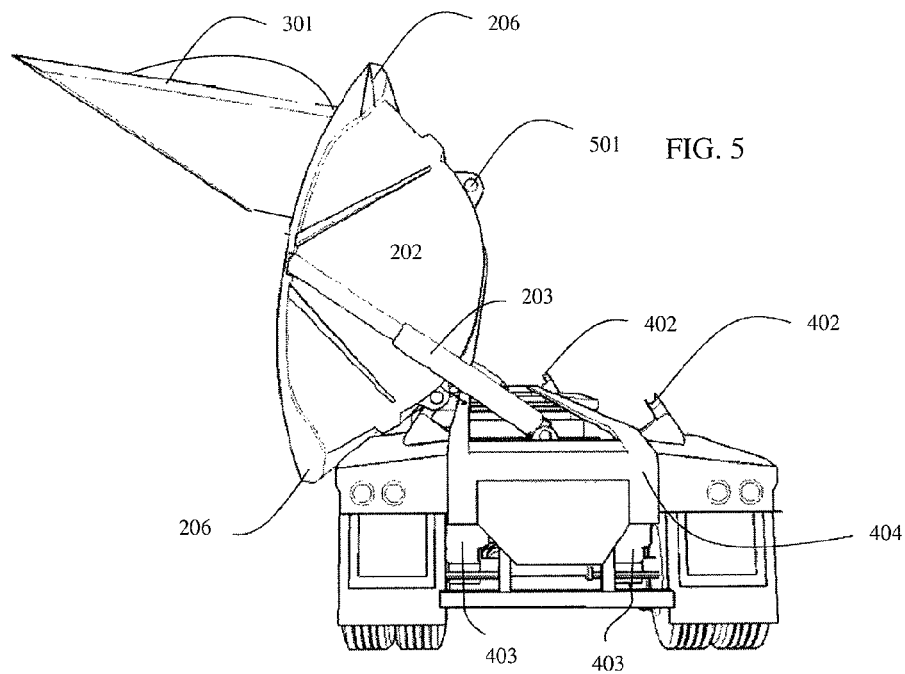
FIG. 5 shows a rear view of the sealed side dump transport vessel with the lid/roof section open and the vessel in a tipped position
Figure 6:
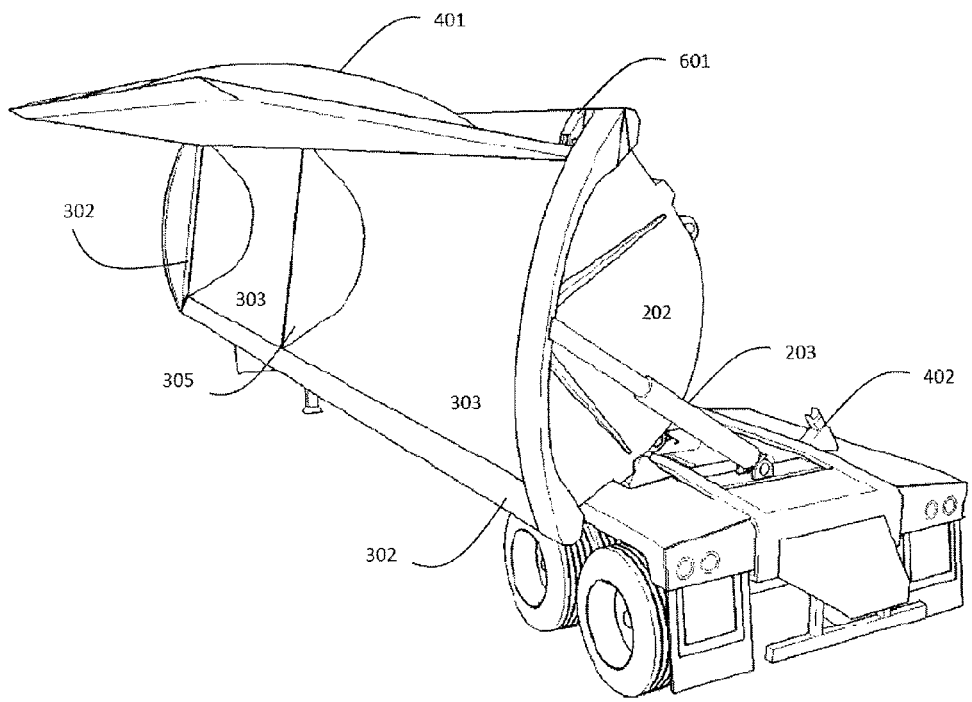
FIG. 6 shows the sealed side dump transport vessel in a tipped position with a view of the fixed baffle system

As demonstrated in FIGS. 2 through 8, the substantially moon shaped container (202) is carried in this example by a two-axle trailer (201). The sealing lid (301) is removably attached to the body of the vessel (202), for example hinged (601) on one side. As shown in FIG. 6, one benefit of the apparatus described herein is that a simple, solid, stationary baffle (305) (preferably metal, such as iron or stainless steel), can be placed near the center of the container (202), and secured, for example, by welding, right in place (see 305 in FIG. 6, for example). So when the transport vessel (101) is moving up or down a hill, for example, the movement of the cuttings can be restricted, so as not to be able to move past the longitudinal center point of the vessel, thus not putting added weight on one axle as opposed to another, e.g., front or rear axle. By being substantially in the center of the container, is also meant to include slightly off center, e.g. a 40:60 weight percent distribution in the vessel, to accommodate such things as the heavier load typically occurring on the drive axles vs. the trailer axles, to carry slightly less weight on the drive axle. Having the solid stationary baffle (305) is also advantageous because the baffle will require only basic reinforcing to maintain integrity of the baffle. Further, the lack of hinges or interconnected bars from baffle to baffle will also reduce the weight of the transport vessel (101), allowing for more cargo to be carried on each trip. That being said, if one were willing to incur the added cost and weight associated with the use of more than one baffle, as long as they are placed so as to evenly distribute the cargo weight evenly and within the legal limits on the axles, two or more baffles could also be used.

FIG. 5 shows a rear view of the sealed side dump transport vessel with the lid/roof section open and the vessel in a tipped or unload position. The two halves (402 and 501) of the locking system shown, secure the vessel to the trailer other than when it is in the unloading mode or position.

Once the driver has arrived at a predetermined location for unloading, the driver would remove or deactivate the sealed lid/roof section locking mechanism(s) (801), and activate the hydraulic cylinders (701) valve so that the lid/roof section can move into a substantially vertical position, so that the transport vessel can begin the relatively simple unloading procedure provided by the system described herein. Once the lid/roof section is substantially vertical, the driver would unlock the locking clamps (402) & (501) that secure the transport vessel in a horizontal position. The locking clamps are not critical to the safe operation of the transport trailer because the large hydraulic cylinders (203) that move the container (202) from a load to unload position would cause the container (202) to otherwise remain secure. However, it is a reasonable and safe practice to include locking mechanisms (402) & (501), selected from those otherwise readily available to those skilled in manufacturing transport vessels. Once the locking clamps (402) & (501) are unlocked, a second hydraulic cylinder valve would be activated which would cause one hydraulic cylinder (203) at each end of the transport vessel to extend in unison, moving the substantially moon shaped vessel from its horizontal transport position to a vertical unloading position, as shown in FIG. 6. The hinge mechanism (304) connects the vessel to the trailer and the vessel would pivot on those hinges. The location of the valve that moves the transport vessel into a vertical position would be typically installed by the manufacturer of the transport vessel at a location convenient and safe for the driver or others to operate.

Figure 9:
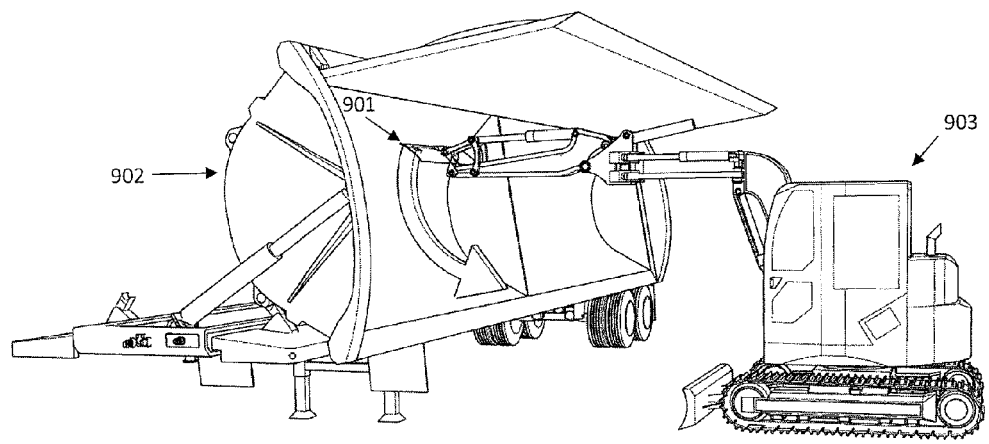
FIG. 9 shows the use of a scraper as described herein.

The vessels can range in length to as little as 30 feet long or less, or be up to 40 feet long, or more, for example, and substantially moon shaped. When the vessel is in the unloading or side dump position, the baffle would obviously not move, being welded or otherwise secured in the vessel (it should also be noted that while the vessel shown contains a single baffle, more than one baffle can be included in the vessel, although not preferred because of the extra weight, added manufacturing complexity, etc., entailed with the use of more than one baffle). The viscous or sticky nature of oil based or salt based unstabilized drill cuttings can cause the cuttings to become stuck, whether frozen in place or compacted in a corner of the transport vessel. While a heating mechanism as described herein can be used to assist in unloading, since unloading takes place in a side dump rather than a vertical dump, the use of heating mechanism is really not needed. Unloading can be facilitated with the use of a simple drag or scraper to clean out the vessel. With a vertical dump vessel, the use of a scrapper would require one to reach up to 40 feet in the vertical position, or more. Because of the side dump unloading of the vessel, typically a scrapper would only have to maneuver 8 or 9 feet in the vertical position, clearly more manageable. In this regard a mechanical scraper can be incorporated into the vessel to scrape the bottom of the vessel to assist in unloading. A mechanical scraper, for example, driven by a small hydraulic motor and fitted within the vessel can be added to the vessel to swipe the interior bottom surface clean. Optionally, if a mechanical scraper was not installed (see FIG. 9), the large openness of the side dump trailer would allow for a mechanical scraper (901) to reach in and gently drag along the bottom of the substantially moon shaped transport vessel (902) so that the compacted, viscous or sticky material could be conveyed out of the transport vessel. This could easily be facilitated using a small excavator (903) with a rubber or plastic scraper blade (901). This also demonstrates, as stated above, an additional clear advantage of the transport system described herein, the ease of unloading the drill cuttings as well.

Figure 3:
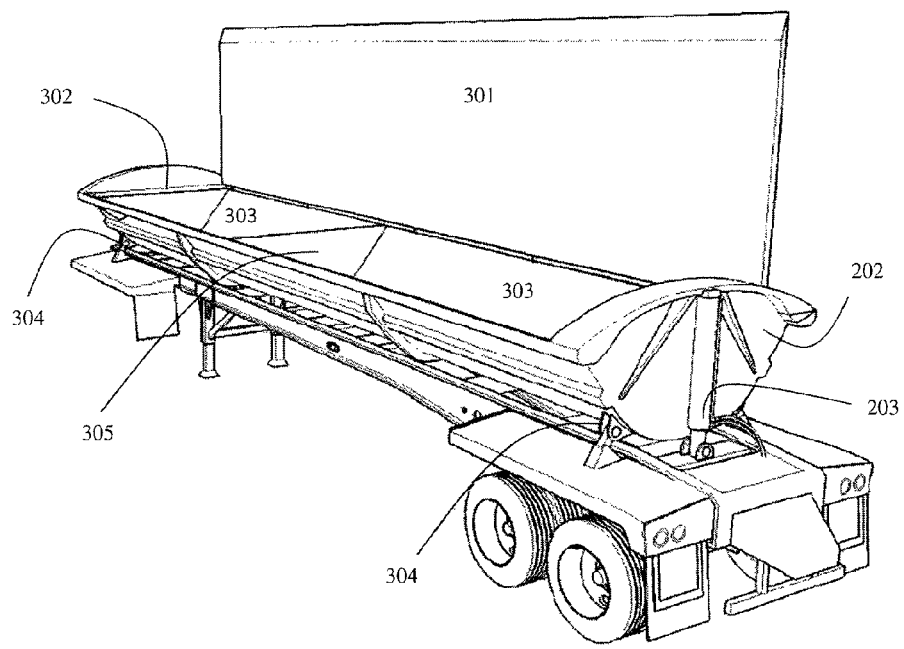
FIG. 3 shows an elevated view of the vessel with the lid/roof open
Figure 4:
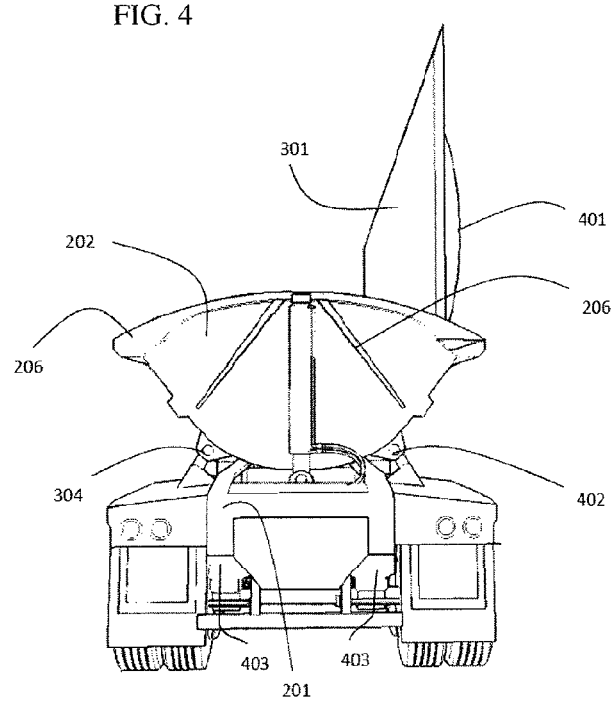
FIG. 4 shows the sealed side dump transport vessel from the rear with the lid/roof section in a vertical or open position

As demonstrated in FIG. 6, the vessel (202) is shown in its unloading or emptying position for removing or dumping the transported cuttings, with the sealing lid (301) shown in its open, non-sealing position. The lid/roof section is shown here in FIG. 3 schematically, and would match the opening in both size and shape to provide the necessary liquid sealing. The lid/roof section is typically one section and can be dome shaped (401) or flat, or include dome shaped reinforcements for rigidity (401), for example. Alternatively, the lid/roof section can be two sections so as to allow different oil based or salt based unstabilized drill cuttings waste streams to be transported at the same time, while maintaining the unstabilized drill cuttings from coming into contact with one another. It is also raised or lowered into and out of the sealing position using conventional hydraulic arms (701). The lid can also be designed to make contact with or actually connect to the baffle (305) thus providing both the lid and the baffle with added stability. See FIG. 3 which demonstrates a top view of a vessel as described herein, including a baffle section (305).

Once the unstabilized drill cuttings have been unloaded, the hydraulic valve can again be activated to move the transport vessel from its vertical unloading position to a horizontal position, followed by activating the hydraulic lid rams (701) which hold the lid section (301) in a vertical position, back to a horizontal position. Alternatively, the driver can also take advantage of the vertical nature of transport vessel (FIG. 5, for example) to first close the sealed lid/roof section (301) and secure the sealed lid/roof section locking mechanism(s) (801), while remaining at the safety of ground level. Once the hydraulic rams (203) on each end of the transport vessel have moved the transport vessel back to a horizontal position the locking clamps (402 & 501) (if equipped) can be locked and the sealed side dump transport trailer (101) is ready to be redeployed.

Figure 10:
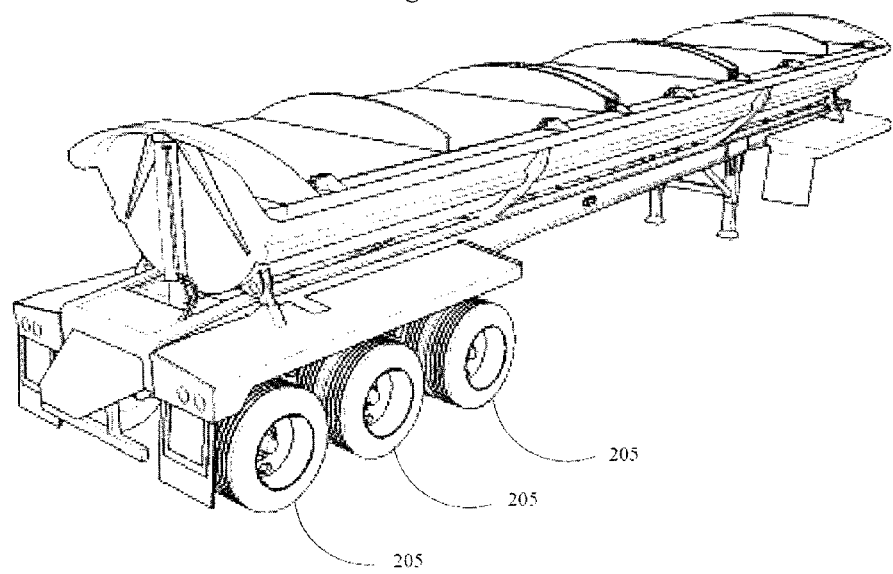
FIG. 10 shows a three axle transport vessel system.

The tables below show both a two axle (see, for example, FIG. 1) and three axle (see, for example, FIG. 10) configuration, estimated vessel weights and legal axle loading in at least one jurisdiction in North America, from which one can determine the required size of the transport vessel in cubic meters, i.e., for 2-3 cubes per axle.

TABLE 1

|  | Tandem Truck | Tandem Trailer |
| --- | --- | --- |
| Basic unit weight | 10000 kgs | 8000 kgs |
| Allowable axle loading | 23000 kgs | 17000 kgs |
| Available cargo | 13000 kgs | 9000 kgs |
| Volume equivalent | 13000/1850 = 7 cubes | 9000 kgs/1850 = 4.8 cubes |
| Meters$^3$ per axle | 2.34 | 2.4 |

TABLE 2

|  | Tridem Truck | Tridem Trailer |
| --- | --- | --- |
| Total unit weight | 11000 kgs | 10000 kgs |
| Allowable axle loading | 30000 kgs | 24000 kgs |
| Available cargo | 19000 kgs | 14000 kgs |
| Volume equivalent | 19000/1850 = 10.3 cubes | 14000 kgs/1850 = 7.6 cubes |
| Meters$^3$ per axle | 2.5 | 2.5 |

TABLE 3

|  | Tandem Truck | Multi-Trailers** |
| --- | --- | --- |
| Total unit weight | 10000 kgs | 15000 kgs |
| Allowable axle loading | 23000 kgs | 40000 kgs |
| Available cargo | 13000 kgs | 25000 kgs |
| Volume equivalent | 13000/1850 = 7 cubes | 25000 kgs/1850 = 13.5 cubes |
| Meters$^3$ per axle | 2.34 | 2.7 |

**Super-B Train configuration used in calculations

TABLE 4

|  | Alberta Legal Axle Loading | British Columbia Legal Axle Loading |
| --- | --- | --- |
| Truck - steering axle | 6000 kgs | 6000 kgs |
| Truck - tandem drive axles | 17000 kgs | 17000 kgs |
| Truck - tridem drive axles | 24000 kgs* | 24000 kgs |

TABLE 4-continued

|  | Alberta Legal Axle Loading | British Columbia Legal Axle Loading |
| --- | --- | --- |
| Trailer - tandem axles | 17000 kgs | 17000 kgs |
| Trailer - tridem axles | 24000 kgs | 24000 kgs |

*if tridem drive axles are between 2.4-2.8 m (center front/center rear) then legal loading is reduced to 23000 kgs The methods and apparatus described herein meet the challenges described above, including, among other things, achieving more efficient and effective drill cutting transport and processing, including prevention, spillage or loss of drill cuttings when the vessel is in a position other than horizontal, e.g., accident, overturn or other upsetting of the transport vessel during transport. Of course during filling and emptying of the vessel, the removably attached lid and end sealing sections would be operated so as to allow filling and emptying.

Thus, the scope of the invention shall include all modifications and variations that may fall within the scope of the attached claims. Other embodiments of the invention will be apparent to those skilled in the art from consideration of the specification and practice of the invention disclosed herein. It is intended that the specification and examples be considered as exemplary only, with a true scope and spirit of the invention being indicated by the following claims.

What is claimed is:

1. A transport vessel specifically adapted for transporting liquid containing unstabilized drill cuttings comprising a moon shaped container body capable of holding liquid containing unstabilized drill cuttings, the body being longer than it is wide and, having two side sections uniformly connected through a smoothly transitioning bottom section, a front section, and an end section, including a fixed baffle section located in substantially the center of its longitudinal length, thereby creating two cargo sections defined by the fixed baffle section and the front and end sections respectively, the substantially moon shaped container body being able to side dump versus vertical dump the drill cuttings by being tilted along its length around a horizontal access so as to empty the drill cuttings, the body section being covered with a liquid sealing lid section, the liquid sealing lid section being removably attached to the body so as to permit ease of filling and emptying of the vessel with liquid containing unstabilized drill cuttings, a set of at least two axles attached to the bottom section and supporting the substantially moon shaped body, where the transport vessel provides stable transport of liquid containing unstabilized drill cuttings absent leakage, loss or spillage of liquid from the vessel in transport or when the vessel is in a position other than horizontal and the lid section is closed.

2. The vessel of claim 1 having an internal volume of up to about 9 cubic meters for each cargo section.

3. The vessel of claim 1 configured to contain about 2 to about 3 cubic meters per axle.

4. The vessel of claim 3 including 2 axles.

5. The vessel of claim 3 including 3 axles.

6. The vessel of claim 1 wherein the container body is removably attached to the axles through rails which allow the container body to empty its load over the side of the transport vessel.

7. The vessel of claim 1 capable of holding up to the legal limit of liquid containing unstabilized drill cuttings.

8. The vessel of claim 1 wherein the liquid containing unstabilized drill cuttings are oil based mud drill cuttings or water containing salt based drill cuttings.

9. The vessel of claim 1 wherein the fixed baffle and the axles are positioned so as to provide a substantially equal weight distribution of liquid containing unstabilized drill cuttings on each set of axles during transport.

10. Multiple vessels as described in claim 1 connected in series.

11. A method of transporting liquid containing unstabilized drill cuttings comprising filling the vessel of claim 1 with liquid containing unstabilized drill cuttings, transporting the filled vessel to a pre-determined dumping location, and unloading by side dumping the liquid containing unstabilized drill cuttings from the vessel, without any leakage of liquid from the drill cuttings during transport.

12. The method of claim 11 wherein the cuttings contain about 20% to about 50% liquids by volume.

13. The method of claim 11 wherein the vessel is filled with cuttings up to the legal weight limit per axle and legal weight limit for the total number of axles, for each vessel.

14. The method of claim 11 wherein the unstabilized drill cuttings are oil based mud drill cuttings or water containing salt based drill cuttings.

15. A transport vessel specifically adapted for transporting liquid containing unstabilized drill cuttings comprising a moon shaped container body capable of holding liquid containing unstabilized drill cuttings, the body being longer than it is wide and, having two side sections uniformly connected through a smoothly transitioning bottom section, a front section, and an end section, including multiple fixed baffle sections located in the container body, thereby creating multiple cargo sections defined by the fixed baffle sections and the front and end sections respectively, the substantially moon shaped container body being able to side dump versus vertical dump the drill cutting by being tilted along its length around a horizontal access so as to empty the drill cuttings, the body section being covered with a liquid sealing lid section, the liquid sealing lid section being removably attached to the body so as to permit ease of filling and emptying of the vessel with liquid containing unstabilized drill cuttings, at least two axles attached to the bottom section and supporting the substantially moon shaped body, where the transport vessel provides stable transport of liquid containing unstabilized drill cuttings absent leakage, loss or spillage of liquid from the vessel in transport or when the vessel is in a position other than horizontal and the lid section is closed.

* * * * *